(12) United States Patent
Yamamoto et al.

(10) Patent No.: US 7,230,603 B2
(45) Date of Patent: Jun. 12, 2007

(54) ILLUMINATION DEVICE AND DISPLAY DEVICE USING THE SAME

(75) Inventors: Tsunenori Yamamoto, Tokyo (JP); Ikuo Hiyama, Tokyo (JP); Akitoyo Konno, Tokyo (JP); Osamu Ito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 602 days.

(21) Appl. No.: 10/696,043

(22) Filed: Oct. 29, 2003

(65) Prior Publication Data

US 2005/0093813 A1  May 5, 2005

(30) Foreign Application Priority Data

Oct. 29, 2002 (JP) .............................. 2002-313779

(51) Int. Cl.
*G09G 3/36* (2006.01)

(52) U.S. Cl. .................... 345/102; 362/31; 362/26; 362/330; 359/559; 359/831; 349/52

(58) Field of Classification Search ................ 345/102, 345/204
See application file for complete search history.

(56) References Cited

U.S. PATENT DOCUMENTS

| | | | | |
|---|---|---|---|---|
| 5,485,354 A | * | 1/1996 | Ciupke et al. | 362/619 |
| 5,808,713 A | * | 9/1998 | Broer et al. | 349/98 |
| 7,030,945 B2 | * | 4/2006 | Umemoto et al. | 349/65 |
| 2004/0240232 A1 | * | 12/2004 | Choi et al. | 362/583 |
| 2005/0030630 A1 | * | 2/2005 | Ohnishi et al. | 359/599 |

FOREIGN PATENT DOCUMENTS

| | | |
|---|---|---|
| JP | 11-194723 | 7/1999 |
| JP | 2000-105345 | 4/2000 |
| JP | 2001-324959 | 11/2001 |
| JP | 2002-049037 | 2/2002 |

OTHER PUBLICATIONS

Ishiguro, et al., "Consideration on Motion Picture Quality of the Hold Type Display with an Octuple-Rate CRT" The Institute of Electronic, Information and Communication Engineers, Technical Report on IEICE. Jun. 1996, pp. 19-26.

* cited by examiner

*Primary Examiner*—Richard Hjerpe
*Assistant Examiner*—Jennifer T Nguyen
(74) *Attorney, Agent, or Firm*—Hogan & Hartson LLP

(57) ABSTRACT

An illumination device and display device using it display motion pictures without a blur and make a light utilizing efficiency of a backlight improved. An illumination device having a light pipe of a substantially parallel flat-form sheet, whose one surface is an outgoing light surface and a light source unit is placed at one side and both side edges, is equipped with a light axis of lights after having entered the light pipe from the light source unit being unparallel to the outgoing light surface of the light pipe, and a reflection body unit consisting of plural unit reflection bodies divided into m in a vertical direction of the light source unit at an opposite side surface of the outgoing light surface of the light pipe, wherein the reflection body unit can contact and separate from the opposite side surface the outgoing light surface of the light pipe for every unit reflection bodies.

32 Claims, 14 Drawing Sheets

ILLUMINATION DEVICE AND DISPLAY DEVICE USING THE SAME

FIELD OF THE INVENTION

The present invention relates to a display device of which motion picture quality is higher, and in particular to the display device such as a liquid crystal display and illumination device used for it.

BACKGROUND OF THE INVENTION

A conventional display device to display such as an image is described below. Until now, as the kind of display device, CRT (Cathode Ray Tube) was a main stream, however these years a liquid crystal display using an active matrix type of liquid crystal display panel (LCD) is widely pervaded. The LCD is not an emissive display, so it visualizes by utilizing transmission or reflection of outside lights or being in combination wit an illumination device (a device placed at back face of the liquid crystal display panel is called a backlight). Accordingly, although pixel displaying operation of the liquid crystal display panel is realized by a light transmittance control from the backlight, it is expressed for convenience as the "light emission" in explanation of display operation of the liquid crystal display below.

The liquid crystal display is a hold-type display different from the CRT which is an impulse-type display, so it is reported in pages 19 through 26 of technical document EID96-4 in Institute of Telecommunications Engineers and the like that an image quality is degraded when displaying motion pictures. According to such the documents, a blur occurs in motion picture images by disaccordance of eye movement due to motion picture images with hold light emission and human vision pursuit characteristics, thereby a motion picture quality being lowered In order to improve degradation of the motion picture quality, it is also described that there exists a method that a frame frequency (display frequency of one screen) is made n-fold rate, or image display is made 1/n fame period and a remaining period made to be displayed in blank. Meanwhile, here the larger a numeral value of the n, the more effective also for motion pictures moving at a higher rate.

A method to realize the improvement method of the motion picture quality, for example, as described in Japan patent laid open publication 2002-49037, generates light emission by concentrating lights only on a part of a backlight at which a light source unit with a linear light source at a side edge of a transparent light transmission sheet is placed, and scrolls the light emission portion being synchronized with a pixel scan of a liquid crystal display, thereby display being made 1/n period and quasi impulse display and a motion picture blur being alleviated. The light selective concentration type of backlight is not needed to flicker a light source, so a needed number of light sources can be lessened.

However, in the light selective concentration type of backlight in the method disclosed in "the above Japan patent", all lights from the light source unit is not always emitted to the liquid crystal display panel side, so the light selective concentration type has a limit at a ratio of outgoing lights into the liquid crystal display panel from a light pipe for incident lights into the light pipe, that is, in a light utilizing efficiency. There exist two causes for this. One is that a scattering profile of a liquid crystal which should scatter lights in an outgoing direction at a selected portion is insufficient and lights are not effectively emitted in a direction of the liquid crystal display panel. The other is that the incident lights uniformly distribute in the light pipe, whereby lights not scattering at the selected portion exist. According to these, the light utilizing efficiency as the backlight results in lowering, thereby an advantage of the light selective concentration backlight which ought to reduce a number of light sources being nullified.

SUMMARY OF THE INVENTION

An exemplary object of the present invention is to provide a light selective concentration type of an illumination device which can restrain reduction of a light utilizing efficiency from a light source unit and lessen a number of light sources provided at the light source unit, and a display unit which restrains a blur of motion pictures using the illumination device, whereby the illumination device is made to be able to display images in a higher quality.

In order to achieve the object, the illumination device of the invention is the device having a light pipe approximately parallel flat form and light source unit(s) at one side edge and two side edges for an outgoing light surface of the light pipe, and has a configuration that a light axis of lights after having entered the light pipe from the light source unit is made unparallel to the outgoing light surface of the light pipe and a reflection body unit divided into m in a vertical direction for a side edge surface (incoming light surface) of the light pipe, where the light source unit is placed at an opposite side of the outgoing light surface of the light pipe, is disposed.

The reflection body unit enables each divided unit reflection body to contact and separate from the light pipe; a surface of each divided unit reflection body contacting/separating from the light pipe side is composed of material with a nearly equal refractive index to that of the light pipe; and a reflection surface reflecting lights, which have entered with a unit reflection body from the light pipe from inside of the light pipe in contact with the light pipe in a direction (liquid display panel direction) of outgoing light surface of the light pipe, is composed within the unit reflection body.

As for a light incidence from the light source unit to the light pipe, a light axis of incident lights from the light source unit to the light pipe may be unparallel to the outgoing light surface of the light pipe, and may also be composed so that the light axis of incident lights from the light source unit to the light pipe may be unparallel to the outgoing light surface of the light pipe by making an optical component intervene between the light source unit and light pipe. Moreover, structure in which an end of a side edge at the light source unit side of the light pipe is slanted for the outgoing light surface is also available.

Meanwhile, an angle φ which a light axis of lights after having entered the light pipe makes with the outgoing light surface of the light pipe in a vertical plane for the light source unit is:

$$\Phi \geq \mathrm{Arc}\,\tan(dkm/L),$$

where d is a thickness in a vertical direction for the outgoing light surface of the light pipe; m is a divide number of the reflection body; L is a length of an outgoing light surface; and k is a ratio (duty number) at which the reflection body contacts the light pipe, and furthermore described, the Φ is desirable to be made as:

$$\Phi \geq \mathrm{Arc}\,\tan(dkm/2L),$$

where d is a thickness in a vertical direction for the outgoing light surface of the light pipe; m is a divide number of the reflection body; L is a length of an outgoing light surface; and k is a ration (duty number) at which the reflection body contacts the light pipe.

Moreover, the light source unit may be made to be able to change a light axis direction, in which lights are emitted to the light pipe from an optical component between the light source itself and light pipe, in a vertical plane for the light source unit. In the case, a change of the light axis according to the light source and optical component is desirable to be synchronized with a cycle of contact and separation of a unit reflection body with/from the light pipe. In a light axis of lights after having entered the light pipe of this time, the angle Φ which is made with the outgoing light surface of the light pipe in a vertical plane for the light source unit is desirable to be in a range of:

Arc tan $(dkm/L)$>Φ>Arc tan $(dkm/(2\ km-1))$, where d is a thickness in a vertical direction for the outgoing light surface of the light pipe; m is a divide number of the reflection body; L is a length of an outgoing light surface; and k is a ratio (duty number) at which the reflection body contacts the light pipe.

Meanwhile, the present invention is not limited to the constitutions described above and after, and it goes without saying that various variations are possible as far as the technical ideas of the invention are not deviated.

DESCRIPTION OF THE PREFERRED EMBODIMENTS

Hereinafter, an illumination device and display device using the illumination device according to the present invention will be described in detail, referring to drawing of the embodiments of the invention.

a. First Embodiment

Figure 1:
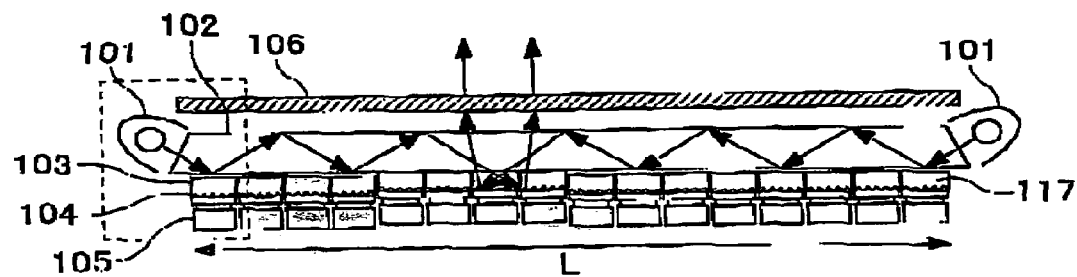
FIG. 1 is a section drawing of main portion of an illumination device schematically illustrating a At embodiment of the invention.
Figure 2:
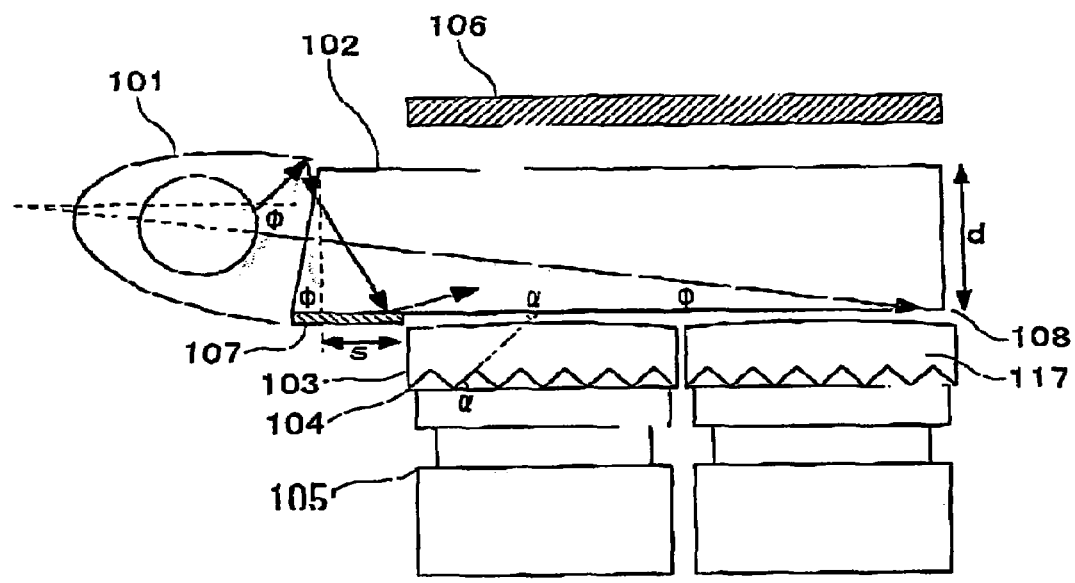
FIG. 2 is an enlarged drawing in a vicinity of a light source enclosed with a broken line frame of FIG. 1.

A first embodiment is described referring to FIGS. 1 and 2.

In illumination device of the embodiment, light source units 101 with cold cathode florescent lights (CCFL) and reflection plates are disposed at ends of opposite two side edges of a light pipe 102. At an opposite side of an outgoing light surface (surface opposite to a scattering sheet 106 placed between a liquid crystal panel not shown in the drawings) of the light pipe 102, that is, under a lower surface in FIG. 1, sixteen unit reflection bodies 103 are disposed. A reflection body unit is composed of the sixteen unit reflection bodies 103. The unit reflection bodies 103 are composed of reflection surfaces 104 and transparent bodies 117 which are at side of the light pipe 102 and heave a nearly same refractive index as he light pipe 102, and the bodies 103 have the reflection surfaces 104 at the opposite side of the light pipe 102.

In FIG. 1, four unit reflection bodies 103 concurrently contact a back surface of the light pipe 102 and other unit reflection bodies separate from its back surface. Lights from the light source units 101 are made to enter the light pipe 102 and propagate its inside totally reflecting. Then, in portions of the unit reflection bodies 103 contacting the light pipe 102, because a retraction index of transparent bodies 117 is equal to that of th light pipe 102, lights propagating inside it proceed inside the unit reflection bodies 103, are reflected with the reflection surfaces 104, and go toward an outgoing light surface at an upper portion of FIG. 1. Then, reflected lights reach an interface with the light pipe 102 at an angle of not more than a total reflection angle, so they are emitted outside the light pipe 102, enter a scattering sheet 106, and bang scattered, become illumination lights of a liquid crystal display panel.

In portions where the unit reflection bodies 105 are separated from the light pipe 102 and do not contact it, lights propagating inside of the light pipe 102 reach the interface with the light pipe 102 at an angle of not less than the total reflection angle, so they arc not emitted outside of the light pipe 102. Thus, in the embodiment, lights, ran be Selectively concentrated only on portions of the light pipe 102 contacted with the unit reflection bodies 103, whereby the liquid crystal display panel corresponding to the portions can be selectively made to generate light emission.

Here, in order for all lights having entered the light pipe 102 out of the above selected portions to be emitted, it is necessary for all the lights to once reach an interface at a lower portion of light pipe 102 of the selected portion. Lights passing through an opposite side without totally reflecting even once at an inner surface of the light pipe 102 are completely a loss, and those which reach the inner surface of the light pipe 102 first time at a way-off portion more than a half of the light pipe 102 from the light source unit side have no possibility of being emitted as illumination lights if the unit reflection bodies 103 are selected at a half of the light source unit side, so those are a loss not less than a half.

Meanwhile, as described in the background of the invention, in order to display motion pictures without a blur in a liquid crystal display, it is necessary to make a light source generate light emission from around one fourth to one second duty being synchronized with an image scan of the liquid crystal display. The embodiment is set to make the light sources generate light emission at one fourth duty, so four out of 16 unit reflection bodies 103 always contact the lift pipe 102. Accordingly, at least during four pieces of unit reflection bodies, it is necessary for most of lights having entered the light pipe 102 to reach its lower portion.

In order to realize the above, the embodiment makes a side end of light source unit side of the light pipe 102 have angles (slants), and in addition, makes the light source units 101 themselves have slants for the light pipe 102. The detail is described using FIG. 2 which is an enlarged drawing of broken line portion of FIG. 1. In order to reflect incident lights from the side of the light source unit 101 in the light pipe 102 not less than once during the four pieces of the unit reflection bodies 105 from a lower portion interface of the light pipe 102, an angle $\Phi$ which a light axis of incident lights makes with the lower portion interface of the light pipe 102 at least need to be:

$$\Phi \geq \text{Arc} \tan(d/2)/(L/mk) = \text{Arc} \tan(dkm/2L) \quad \text{(eq: 1)}$$
$$= \text{Arc} \tan(2d/L),$$

where d is a thickness of the light pipe 102; m is a number of unit reflection bodies 103 (divide number of a reflection body unit; L is a length of an outgoing light surface, k is a duty number, and mk=4 in the embodiment. That is, the $\Phi$ is an angle at which lights entering a thickness center of the light pipe 102 reach a position of four pieces of the unit reflection bodies 103.

In addition, lights from the light source unit 101 has a certain degree of distribution for a light axis, so an angle at which lights having entered a thickness middle of the light: pipe 102 reach a middle of four pieces of the unit reflection bodies 103, that is, a position of two pieces of the unit reflection bodies 103, is more preferable. In the case, the previous equation (1) is given as:

$$\Phi \geq \text{Arc} \tan(d/2)/(L/2mk) = \text{Arc} \tan(dkm/L) \quad \text{(eq: 2)}$$
$$= \text{Arc} \tan(4d/L).$$

The case of the embodiment is an illumination device for an XGA liquid crystal display panel of Which diagonal length is nominal 15 inches and adopts the condition of the equation (2), whereby a side edge surface (incoming light surface) of the light pipe 102 is made $\Phi \cong 8$ degrees (L=230 mm and d=8 mm) in angle from verticality (verticality for an outgoing light surface of the light pipe 102). Moreover, the light source unit 101 being also matched with the side edge of the light pipe 102, its angle is designed to be $\Phi \cong 8$ degrees.

Meanwhile, because the embodiment uses an acryl sheet with a refractive index n of 1.49 as the light pipe 102 and makes the end (side edge) of the light pipe 102 have the angle of eight degrees, it does not become a condition that a part of lights entering from the end edge of the light pipe 102 totally reflects at all inner surfaces. To be more precise, in FIG. 2, lights entering at 90 degrees in angle from a vicinity of outgoing light surface of a side edge at the light source unit side of the light pipe 102 result in being emitted at a lower side surface of the light pipe 102 from characteristics of light distribution from the light source unit 101, although lights entering at 90 degrees in angle from the position are extremely a few, when entering a nearby unit reflection body 103, they become stray lights and also cause degradation of a picture quality in some cases.

Therefore, the embodiment places a reflective optical element 107 as an optical compound at a lower portion of light source unit aide of the light pipe 102 and returns outgoing lights within the light pipe 102 from there by changing their angles. Largeness of the reflective optical element 107, assuming that a distance from an end portion of obtuse angle side of the light pipe 102 is an S, is given as:

$$S-d \tan(\text{Arc Sin } 1/n), \quad \text{(eq: 3)}$$

where d is a thickness of the light pipe 102 and n is a refractive index of the light pipe 102. This is a distance until which lights entering the light pipe 102 reach a condition that they totally reflect at its inner surface.

Thus, lights having entered the light pipe 102 propagate with total reflection through the inner surface of the light pipe 102, and after proceeding in the unit reflection bodies 103 out of the reflecting body unit which contact the light pipe 102, the lights are reflected by its mountain shaped reflection surfaces 104. The mountain-shaped reflection surfaces 104 are almost flat and an angle $\alpha$ for a lower surface of the light pipe 102 is designed to be:

$$\alpha=(90-\Phi)/2. \quad \text{(eq:4)}$$

Here, the $\Phi$ is an angle of the light axis and the angle $\alpha$ is an angle at which incident lights of the angle $\Phi$ are vertically emitted from an outgoing light surface. Although lights reaching the reflection surfaces 104 not only are the lights of the angle $\Phi$ but also have distribution, in case of making the lights of the angle $\Phi$ vertically emitted, distributing lights result in being emitted according to their distribution.

Meanwhile, because the light axial angle $\Phi$ is uniform within the light pipe 102, the reflection surfaces 104 arc designed to be a same constitution in all unit reflection bodies 103. In addition, in order to reduce outgoing non-uniformity in an outgoing light surface, a plurality of mountain-shaped reflection surfaces 104 are composed within one reflection body 103.

Next, a relationship of contact and separation of the unit reflection body 103 and light pipe 102 is described. In order for lights propagating within the light pipe 102 to proceed within the unit reflection bodies 103 by the bodies 103 contacting the light pipe 102, close contact of the light pipe 102 and unit reflection bodies 103 is needed. Air and the like remain at an interface of the both, and if an air layer exists, lights result in not propagating from the light pipe 102 to the unit reflection bodies 103 at the portion.

For the above countermeasure, the embodiment uses, as transparent bodies 117 with the unit reflection bodies 103, gel material which is deformable. In addition, as shown in FIG. 2, a surface at side of the light pipe 102 is designed to be a smooth shape of which middle portion is high seen in a light propagating direction. Moreover, a matching oil 108 nearly equal to the light pipe 102 and transparent bodies 117 in refracting index is coated.

According to the constitution thus described, when a unit reflection body 103 contacts the light pipe 102, it starts to contact the light pipe 102 from a middle protruded portion, and slowly deforming, it closely contacts the light pipe 102, thereby an air layer does not almost occur in their interface.

Next, a mechanism making the unit reflection body 103 contact and separate from the light pipe 102 is described. The embodiment uses an electromagnetic actuator 105 as the unit reflection body 103 and it is fixed on an outer frame of a display device not shown in the drawings through the actuator 105. The actuator 105 converts electric signals to positional moves using an electro magnet and a magnet. As a simple example, a voice coil driving mechanism of a speaker can be cited. By controlling electric signals input in the electromagnetic actuator 105, the contact and separation of the unit reflection body 103 and light pipe 102 to be controlled.

As thus described, the embodiment can emit lights from the light source unit 101 as illumination lights of a liquid crystal display panel, selectively/concentratingly only from a selected region contacting the unit reflection bodies 103. Here, because the embodiment is designed to make the ends of end edges (side edges) of the light source unit 101 and light pipe 102 have angles, thereby lights surely reaching the selected region, and to make the mountain-shaped reflection surfaces 104 within the unit reflection bodies 103 have angles, thereby lights within the light pipe 102 be vertically emitted mainly for the outgoing light surface, a ratio of outgoing lights for incident lights, so called a light utilizing efficiency, becomes very high, whereby a number of linear light sources such as cold cathode luminescent lights provided at the light source unit can be lessened.

b. Second Embodiment

Figure 3:
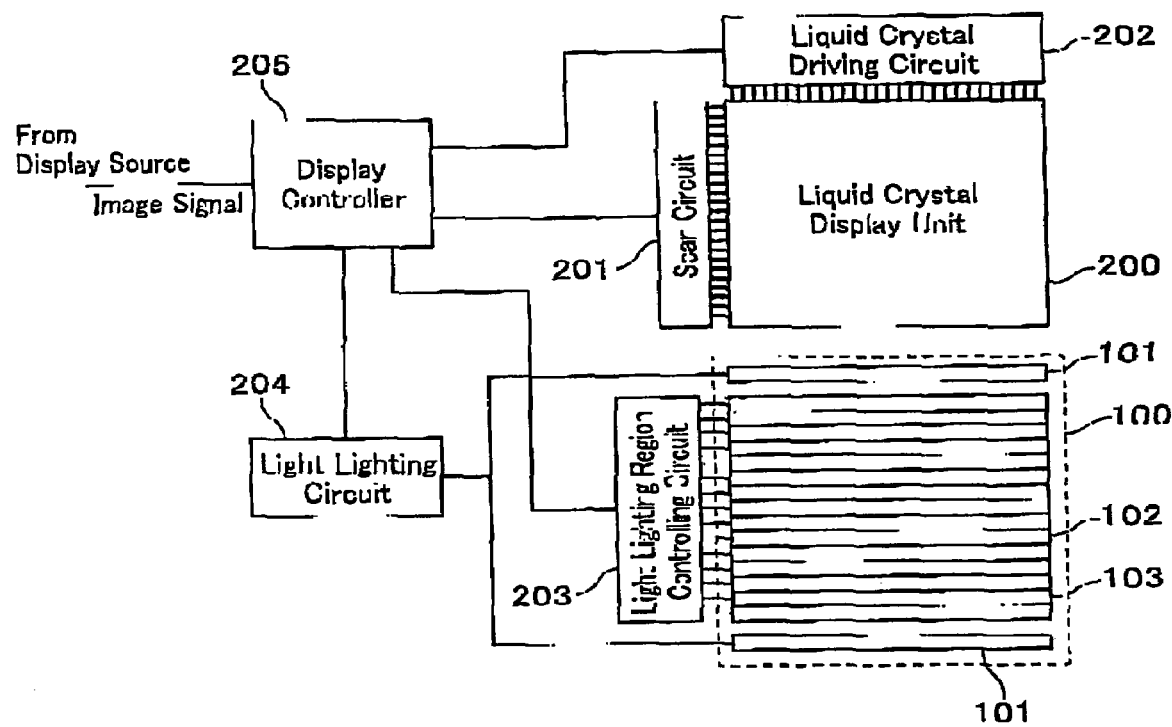
FIG. 3 is a block diagram of drive system example of a liquid crystal display illustrating a second embodiment of th invention.

FIG. 3 is a block diagram of drive system example of a liquid crystal display illustrating a second embodiment of the invention and is a liquid crystal display using an illumination device illustrated in FIGS. 1 and 2. In FIG. 3, a backlight unit 100 shown with a broken line frame is the illumination device described in the first embodiment. It also includes light source units 101 making cold cathode luminescent lights as a light source, a light pipe 102, and a reflection body unit divided into a plurality of unit reflection bodies 103. A lighting region control circuit 203 controls contact and separation of the backlight unit 100 and each unit reflection body 103. Meanwhile, in FIG. 3, along opposite two side edges of the light pipe 102, the light source units 101 which make cold cathode luminescent lights respective light sources are provided.

In addition, a display device is composed of a lighting circuit 204 lighting the light source units 101, a liquid crystal display unit 200 composed of a liquid crystal display panel placed on an upper portion of an outgoing light surface of the backlight 100, a scan circuit 201 which is the scan line driving circuit described before to select one row portion to rewrite images within the liquid crystal display unit 200, a liquid crystal driving circuit 202 which in a signal line driving circuit to write image data in liquid crystal pixels of a selected rewrite portion, and a display controller 205 controlling the above circuits by image signals from a display source. Meanwhile, an image rewrite scanning direction of the scan circuit 201 is a same direction as in which the unit reflection bodies 103 of the backlight unit 100 range.

As described several times until now, in order to clearly display motion pictures without a blur in such the liquid crystal display, an image rewrite of the liquid crystal display, that is, to make a backlight generate light emission at around one fourth to one-second duty being synchronized with an image scan is needed. The embodiment controls a selected region of the backlight unit 100 by synchronizing it with the image scan of the liquid crystal display unit 200, thereby making the backlight unit 100 generating light emission at one fourth duty. This drive sequence is shown in FIG. 4.

Figure 4:
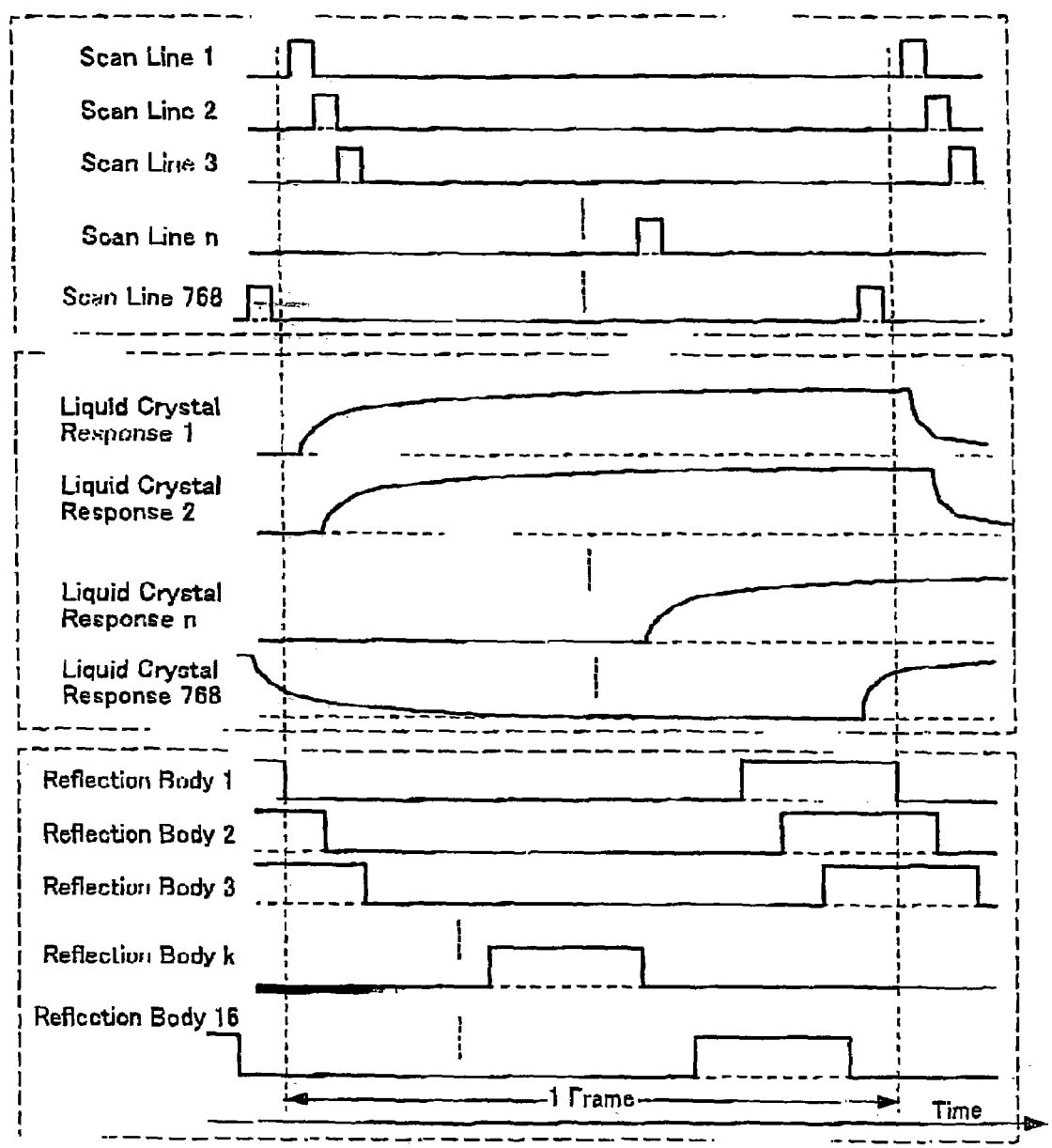
FIG. 4 is a timing drawing illustrating a drive sequence in a motion picture display of a liquid crystal display illustrated in FIG. 3.

FIG. 4 is a timing drawing illustration, The drive sequence in a motion picture display of the liquid crystal display illustrated in FIG. 3. In this example, a number of scan lines is 768 lines (786 rows) and a divide number m of unit reflection bodies is: m=16. A lateral axis is time, and the liquid crystal unit 200 being divided into three regions, top, middle, and bottom, the axis shows timings to operate the scan circuit 201, liquid crystal display unit 200, and unit reflection bodies 103. Firstly, the scan circuit 201, in order to rewrite images of the liquid crystal display unit 200, sequentially selects pixels of one row of a scan line from an upper portion when the display unit is longitudinally put: that is, sequentially scans one by one a scan line 1, scan line 2, scan line 3, . . . , scan line n, . . . , 6 can line 768 with which pixels of one row are connected According to the scans, liquid crystals of the pixels are rewritten, and as shown in a liquid crystal response 1, liquid crystal response 2, . . . , liquid crystal response n, liquid crystal response 768, the liquid crystal responses are started.

A liquid crystal used in the embodiment is about 12 mili-seconds in response rate, so during a last one fourth period of one frame (usually 60 Hz =16.6 mili-seconds) which is a rewrite cycle of one screen displayed in the liquid crystal display unit 200, the responses almost finish and an assumed transmission ratio are thought to leave been reached. Then, matching the last one fourth period of rewrite cycle of each liquid crystal pixel, if selecting a unit reflection body 103 just under the pixel and generating light emission shown as a first unit reflection body (reflection body 1 in the drawing), a second unit reflection body (reflection body 2 in the drawing), a third unit reflection body (reflection body 3 in the drawing), . . . , an n-th unit reflection body (reflection body k in the drawing), an assumed image can be obtained. In the drawing, a unit reflection body is simply indicated as a reflection body.

However, in the embodiment, because the number of scan lines is 768 lines and on the other hand the divide number of the unit reflection bodies 103 is 16, one unit reflection body 103 corresponds to 48 scan lines, that is, pixels of 48 rows. In the case, the embodiment controls the contact and separation (light emission and non light emission) of the unit reflection bodies 103 so that the backlight lights at the last one fourth period of rewrite cycle of pixels of middle portion of the 48 row pixels.

Thus, shown in FIG. 4, the control of the unit reflection bodies 103 is also scanned from top to bottom, is repeated for one frame period, and results in being synchronized with a scan cycle of scan lines.

The above description is about a drive system to clearly display motion pictures by making the backlight generate light emission at one fourth duty, however, when using the system in displaying still pictures, flickers appear in a screen and some picture quality is degraded. This is because the backlight unit 100 flickers at a frequency of 60 Hz which is a perceptible level to human eyes. Therefore, in the embodiment, a drive system in the case of displaying the still pictures is separately prepared.

Figure 5:
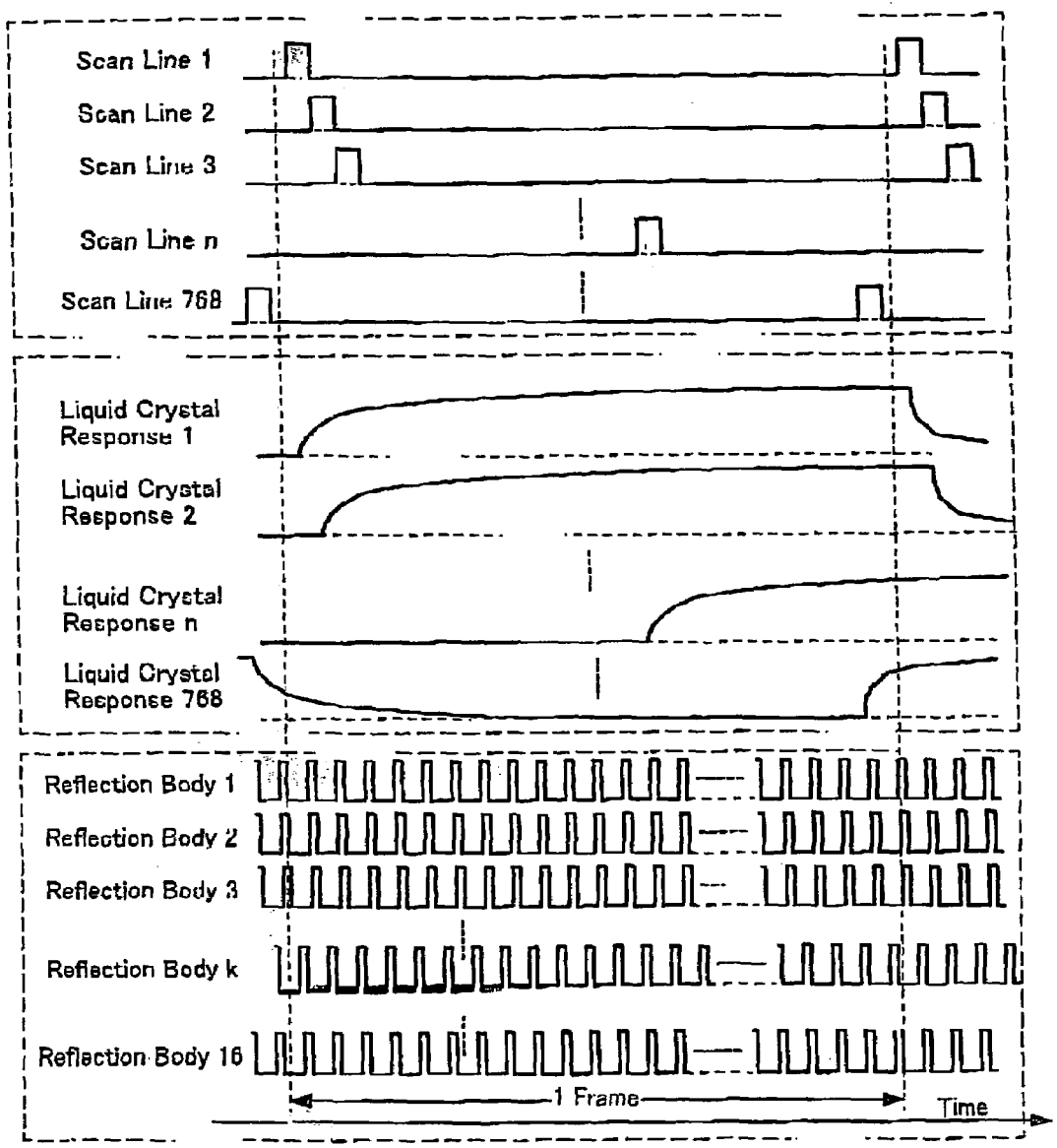
FIG. 5 is A timing drawing illustrating a drive sequence in a still picture display of a liquid crystal display illustrated in FIG. 3.

FIG. 5 is a timing drawing illustrating a drive sequence in a still picture display of a liquid crystal display illustrated in FIG. 3. Although to rewrite images of the liquid crystal display unit 200 by so of scan lines is same as in FIG. 4, a frequency of contact with and separation from a light pipe of the 1st, . . . , n·th, . . . 16th unit reflection body (indicated in the drawing as reflection body 1, . . . , n, . . . , 16) is made equal to or larger than one order of magnitude comparing with the case in FIG. 4. However, a turn and phase controlling the contact and separation of each unit reflection body are same as in FIG. 4 and sequentially scanning the reflection body 1 at a top portion to the reflection body 16 at a bottom portion when the display device is longitudinally put, the contact and separation are performed. Thus, by increasing a frequency equal to or larger than one order of magnitude, flickers due to flickering of the backlight unit 100 result in being imperceptible to the human eyes, whereby flickers in displaying the still pictures result in not occurring.

Thus, the embodiment can drive the above drive systems for a motion picture display (motion picture mode) and still picture display (still picture mode) for respective displays in optimal forms by judging me signals from a display source and automatically changing through the display controller 205 shown in FIG. 3.

As thus described, the embodiment enables the motion picture display as well as the still picture display to be clearly displayed without degradation of A picture quality by using the light selective concentration type of illumination device with the high utilizing efficiency described in the first embodiment. Meanwhile, although the embodiment changes the motion picture mode and still picture mode by judging signals, methods as follows are also available: a change signal of the modes is supplied from a display source, thereby the display modes being changed; and thereby providing a switch which a user of a display device manifestly being able to change.

c. Third Embodiment

Figure 6:
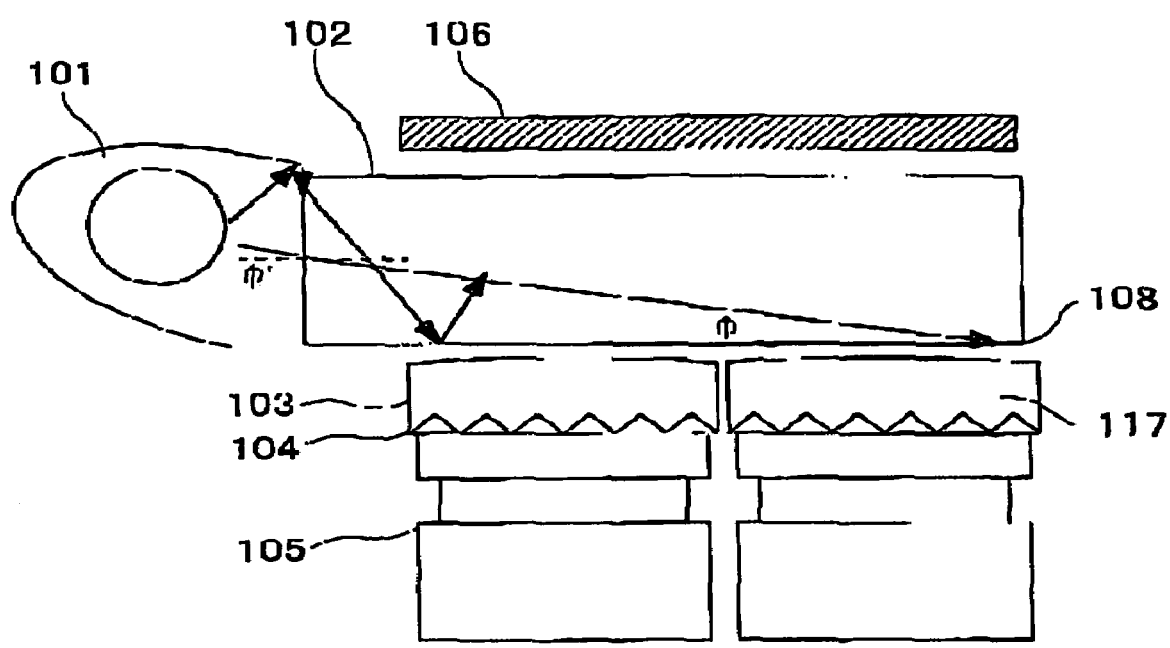
FIG. 6 is a section drawing of main portion of an illumination device schematically illustrating a third embodiment of the invention.

FIG. 6 is a section drawing of main portion of an illumination device schematically illustrating a third embodiment of the invention. The embodiment is same as the first embodiment except below requirements. Repetitive description of the same portions as in the first embodiment is omitted. That is, end shapes of side edges of a light source unit 101 and light pipe 102 in the embodiment are different from those in FIG. 2 and are vertical for an outgoing light surface. A point that the light source unit 101 is slanted for the outgoing light surface of the light pipe 102 is same, however its angle $\Phi'$ is different. In the embodiment, an end shape of the light pipe 102 is not vertical for a light axis $\Psi$ (according to equation 2 (eq: 2)) after lights entering the light pipe 102, so refraction occurs at the end. The refraction is considered for the slant $\Phi'$ of the light source unit 101 and a following equation is designed to work out:

$$\text{Sin } \Phi' = \text{Sin } \Phi, \qquad \text{(eq: 5)}$$

where n is a refractive index of the light pipe 102. In the embodiment, a slant $\Phi$ is about eight degrees in angle same as in the first embodiment and a refractive index n is 1.49 because of use of acryl as the light pipe, thereby $\Phi' \cong 12$ degrees in angle.

In addition, as described above, if the end of side edge of the light pipe 102 is vertical for the outgoing light surface and lower surface and the refractive index n is 1.49, incident lights from the end have angles not less than a total reflection angle and do not be emitted. Then, the reflective optical element 107 existing in FIG. 2 is unnecessary in the embodiment.

As thus described, although the embodiment is different compared with the first embodiment in the side edge shape of the light pipe and a disposition of the light source unit 101, same as the first embodiment it can selectively/concentratingly emit lights, which have entered the light pipe 102 from the light source unit 101, only from a selected region which the unit reflection bodies 103 contact. In addition, because the embodiment is designed to make the light source unit 101 have an angle for the end of the light pipe 102, thereby lights surely reaching the selected region, and to make reflection surfaces 104 within the unit reflection bodies 103 have angles, thereby lights within the light pipe 102 being vertically emitted mainly for the outgoing light surface, a ratio of outgoing lights for incident lights, so called a light utilizing efficiency, becomes very high, whereby a number of linear light sources at the light source unit 101 can be lessened. Meanwhile, by using the illumination device of the embodiment instead of illumination device of the first embodiment, an illumination device which can clearly display motion pictures and still pictures described in the second embodiment can be composed.

d. Fourth Embodiment

Figure 7:
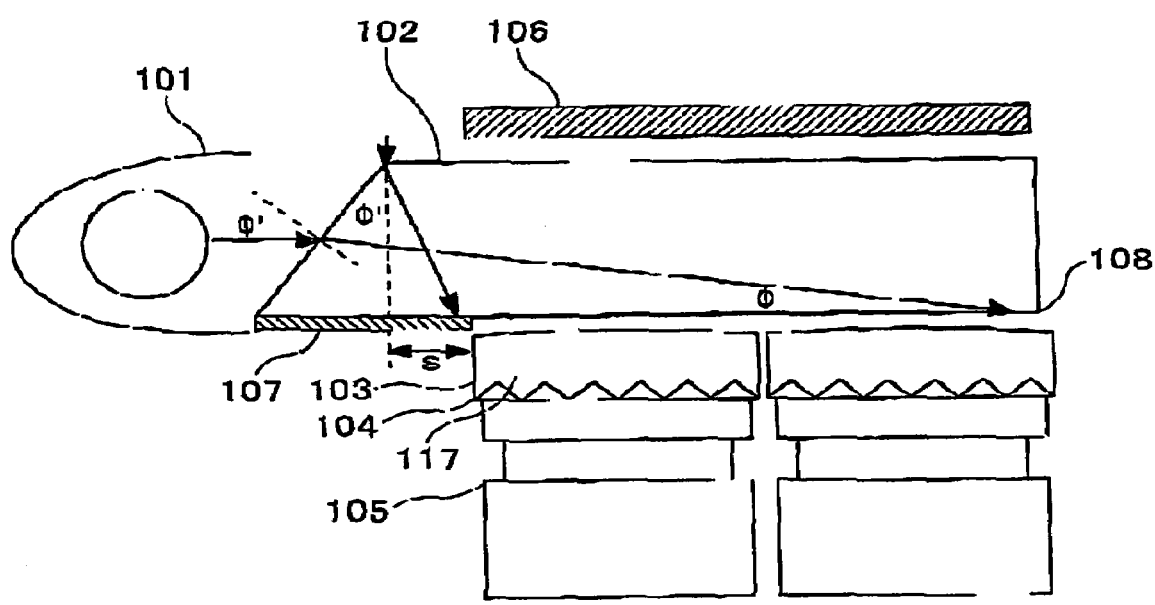
FIG. 7 is a section drawing of main portion of an illumination device schematically illustrating a fourth embodiment of the invention.

FIG. 7 is a section drawing of main portion of an illumination device schematically illustrating a fourth embodiment of the invention. The embodiment is same as the first embodiment except below requirements. Repetitive description of the same portions as in the first embodiment is omitted. That is, end shapes of side edges of a light source unit 101 and light pipe 102 in the embodiment have an angle for an outgoing light surface of The light pipe 102, same as in FIG. 2. However, its angle $\Phi'$ is different from that of the first embodiment. In addition, a point that the light source unit 101 is not slanted for an outgoing light surface of the light pipe 102 is also different from the first embodiment.

In the embodiment, the light source unit 101 is not slanted for the outgoing light surface of the light pipe 102, so a light a of lights emitting from the light source unit 101 is parallel to the outgoing light surface of the light pipe 102. The embodiment makes the light axis, according to refraction at the end of the light pipe 102, an angles $\Phi$ (according to equation 2 (eq: 2)) of a light axis after lights entering the light pipe. Therefore, an angle $\Phi'$ needed at an end portion satisfies the following:

$$(\Phi' \cdot \text{Arc Sin } ((\text{Sin } \Phi')/n)) = \Phi, \qquad \text{(eq: 6)}$$

where n is a refractive index of the light pipe 102. In the embodiment, the light pipe 102 is also acryl, so n=1.49. Accordingly, the angle $\Phi'$ is designed as $\Phi' \cong 24$ degrees in angle.

As thus described, although the embodiment is different compared with the first embodiment in the side edge shape of the light pipe 102 and the disposition or the light source unit 101, same as the first embodiment it can selectively/concentratingly emit lights which have entered the light pipe 102 from the light source unit 101, only from a selected region which the unit reflection bodies 103 contact. In addition, because the embodiment is designed to make the light source unit 101 have an angle, thereby lights surely reaching the selected region, and to make reflection surfaces 104 within the unit reflection bodies 103 have angles, thereby lights within the light pipe 102 being vertically emitted mainly for the outgoing light surface. Thus, a ratio of outgoing lights for incident lights, so called the light utilizing efficiency, becomes very high, whereby a number of linear light sources at the light source unit 101 can be lessened. Meanwhile, by using the illumination device of the embodiment instead of illumination device of the first embodiment, an illumination device which can clearly display motion pictures and still pictures described in the second embodiment can be composed.

e. Fifth Embodiment

Figure 8:
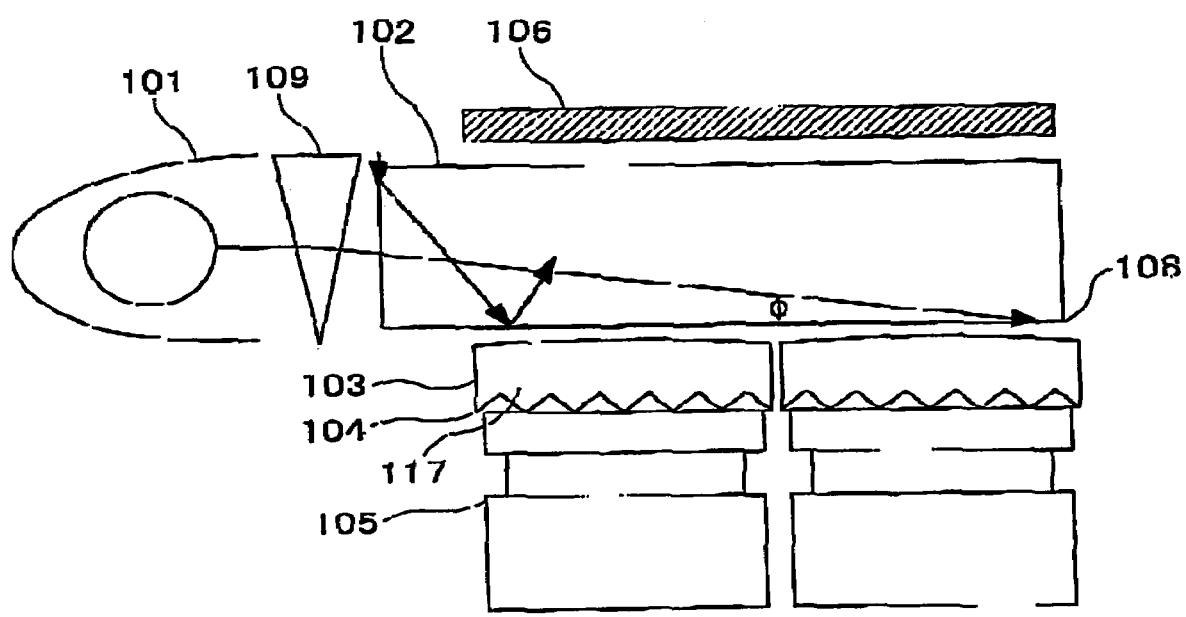
FIG. 8 is a section drawing of motion portion of an illumination device schematically illustrating a fifth embodiment of the invention.

FIG. 8 is a section drawing of main portion of an illumination device schematically illustrating a fifth embodiment of the invention. The embodiment is same as the first embodiment except below requirements. Repetitive description of the same portions as in the first embodiment is emitted. That is, end shapes of side edges of a light source unit 101 and light pipe 102 in the embodiment are different from those in FIG. 2 and are vertical for an outgoing light surface of the light pipe 102. In addition, a point that the light source unit 101 is not slanted for the outgoing light surface of the light pipe 102 is different from FIG. 3. Moreover, in the embodiment, a refractive optical element 109 is disposed between the light source unit 101 and light pipe 102. The refractive optical element 109 is designed to refract lights emitted parallel to the outgoing light surface of the light pipe 102 from the light source unit 101 and designed for the light axis at time of incidence the light pipe 102 to become the Φ (according to equation 2 (eq: 2)).

As thus described, although the embodiment is different compared with the first embodiment in he side edge shape of the light pipe 102 and the disposition of the light source unit 101 and the refractive optical element 109 is used, same as the first embodiment it can selectively/concentratingly emit lights which have entered the light pipe 102 from the light source unit 101, only from a selected region which the unit reflection bodies 103 contact. In addition, because the embodiment is designed to make the light source unit 101 have an angle, thereby lights surely reaching the selected region, and to make reflection surfaces 104 within the unit reflection bodies 103 have angles, thereby lights within the light pipe 102 being vertically emitted mainly for the outgoing light surface. Thus, a ratio of outgoing light for incident lights, so called the light utilizing efficiency, becomes very high, whereby a number of linear light sources at the light source unit 101 can be lessened. Meanwhile, by using the illumination device of the embodiment instead of illumination device of the first embodiment, an illumination device which can clearly display motion pictures and still pictures described in the second embodiment can be composed.

f. Sixth Embodiment

Figure 9:
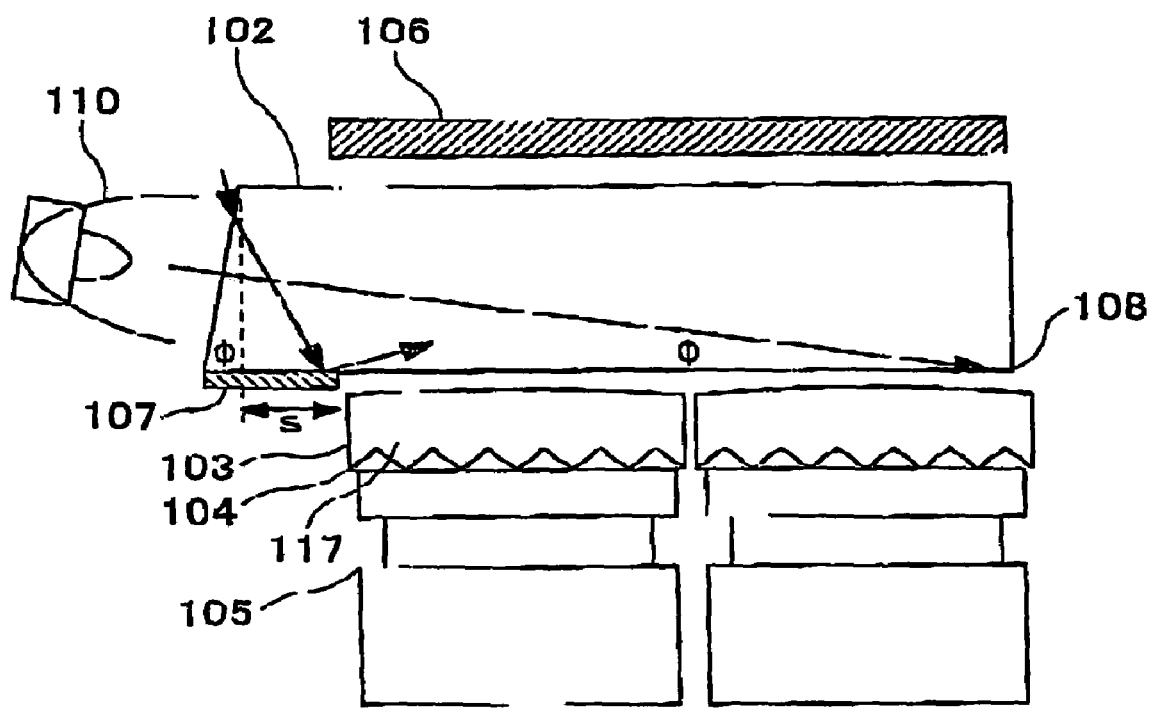
FIG. 9 is a section drawing of main portion of an illumination device schematically illustrating a sixth embodiment of the invention.

FIG. 9 is a section drawing of main portion of an illumination device schematically illustrating a sixth embodiment of the invention. The embodiment is same as the first embodiment except below requirements. Repetitive description of the same portions as in the first embodiment is omitted. FIG. 9 shows a configuration example around an end portion of side edge of the light pipe 102. The embodiment uses an LED array as a light source of the light source unit 101 instead of the cold cathode luminescence light in each the embodiment described before. Although the LED array is at this moment poorer in efficiency than the cold cathode luminescence light and high in cost, there exist such large advantages that the LED array is better in angle distribution characteristics of outgoing lights centering a light axis than the light source using the cold cathode luminescence light and higher in color purity. To be higher in the color purity enables a picture quality of the display device to be further improved and to be better in the angle distribution characteristics of outgoing lights causes a ratio of lights reaching selected unit reflection bodies 103 to become larger, thereby the light utilizing efficiency as the illumination device being able to further be heightened.

Thus, although the embodiment is different from the first embodiment in a used light source, same as the first embodiment the embodiment can selectively/concentratingly emit lights which have entered the light pipe 102, only from a selected region contacting the unit reflection bodies 103. In addition, the embodiment is designed to make the end of the light source unit 101 for the light pipe 102 have an angle, thereby lights surely reaching the selected region, and to make the reflection surfaces 104 within the unit reflection bodies 103 have angles, thereby lights within the light pipe 102 being vertically emitted mainly for the outgoing light surface. Then, a ratio of outgoing lights for incident lights, so called the light utilizing efficiency, is very high. Moreover, using the LED array instead of the cold cathode luminescence light, the embodiment can further heighten the light utilizing efficiency than the first embodiment.

Meanwhile, although the embodiment makes the slant of the light source unit 101 for the end of the light pipe 102 and the end shape of side edges of the light pipe 102 same as the first embodiment and makes a light axis within the light pipe 102 the Φ, as in the third embodiment only the light source unit 101 may be slanted and to make the end of side edge of the light pipe 102 have an angle is available. Moreover, it goes without saying that the light axis may also be changed by making the refractive optical element shown in the fifth embodiment intervene between the light source unit 101 and light pipe 102. Still moreover, when composing such the display device described in the second embodiment using the illumination device of the embodiment instead of the first embodiment, the color purity of image display is heightened, thereby motion pictures and still pictures clearly being displayed.

g. Seventh Embodiment

Figure 10:
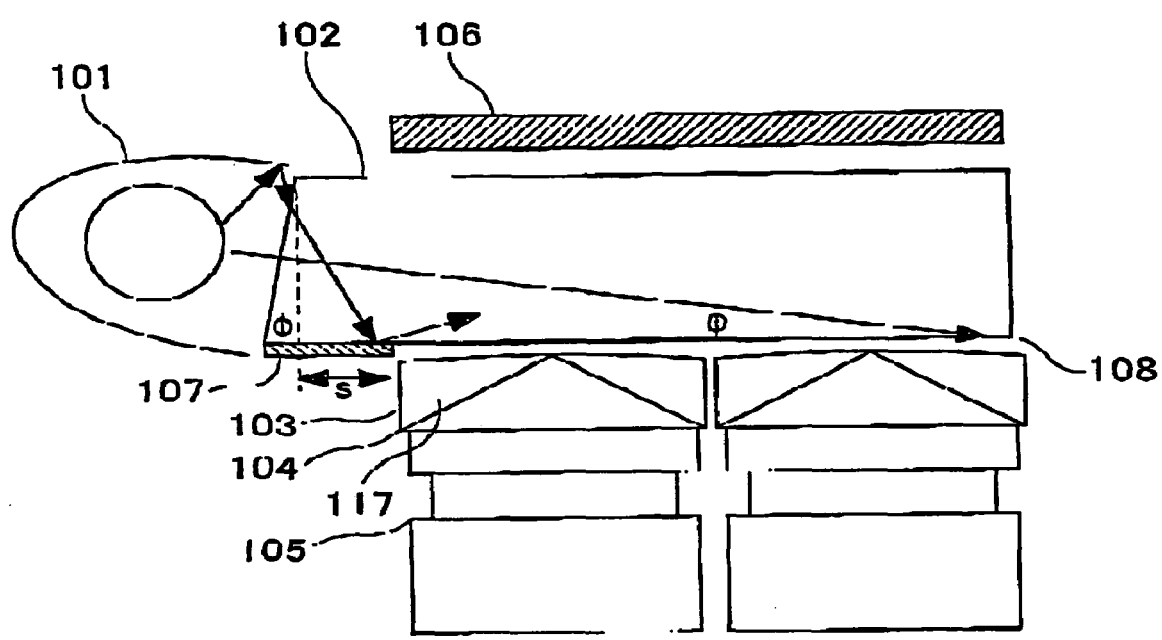
FIG. 10 is a section drawing of main portion of an illumination device schematically illustrating, a seventh embodiment of the invention.

FIG. 10 is a section drawing of main portion of an illumination device schematically illustrating a seventh embodiment of the invention. The embodiment is same as the first embodiment except below requirements. Repetitive description of the same portions as in the first embodiment is omitted. That is, a difference from FIG. 2 illustrating the first embodiment is a point that the reflection surfaces 104 within the unit reflection bodies 103 are composed not of plurality of mountain shapes but of one mountain shape. Thus being composed of one mountain shape, light abnormal reflection occurring near a mountain top and valley bottom in the case of plurality of the mountain shapes can be reduced. Not being able to keep a reflection angle, surfaces are apt to become flat near the mountain top and valley bottom different from slant portions. Therefore, reflection near them is reflected in directions not considered in designing, thereby causing the light utilizing efficiency to be reduced. The embodiment improves the light utilizing efficiency of the illumination device as a whole by reducing areas of the mountain top/valley bottom portions with making the mountain shape one.

Thus, although the embodiment makes the reflection surfaces 104 within the unit reflection bodies 103 be composed of one mountain shape, there exists no difference in a point that lights having entered the light pipe 102 from the light source unit 101 same as in the first embodiment can selectively/concentratingly be emitted only from a selected region which the unit reflection bodies 103 contact. In addition, because the embodiment is designed to make the light source unit 101 have an angle, thereby lights surely reaching the selected region, and to make reflection surfaces 104 within the unit reflection bodies 103 have angles, thereby lights within the light pipe 102 being vertically emitted mainly for the outgoing light surface, a ratio of outgoing lights for incident lights, so called the light utilizing efficiency, becomes very high. Moreover, because the reflection surfaces 104 are made one mountain shape, a reflection efficiency at the reflection surfaces 104 is heightened, thereby the light utilizing efficiency being able to be more heightened than that of the first embodiment.

Meanwhile, although the embodiment makes the slant of the light source unit 101 and the end shape of side edge of the light pipe 102 same as in the first embodiment, thereby making the light axis within the light pipe 102 the $\Phi$, to slant only the light source unit 101 as the third embodiment and to make only the end edge portion of the light pipe 102 have an angle arc available. In addition, it is possible to compose so as to change the light axis by making such the refractive optical component in the fifth embodiment intervene between the light source unit 101 and light pipe 102. Same as in the sixth embodiment, an LED array may be used as th light source unit. Moreover, by composing the display device of illumination device of the first embodiment instead of illumination device of the embodiment, it is possible to compose the display device which can clearly display motion pictures and still pictures as described in the second embodiment.

h. Eighth Embodiment

Figure 11:
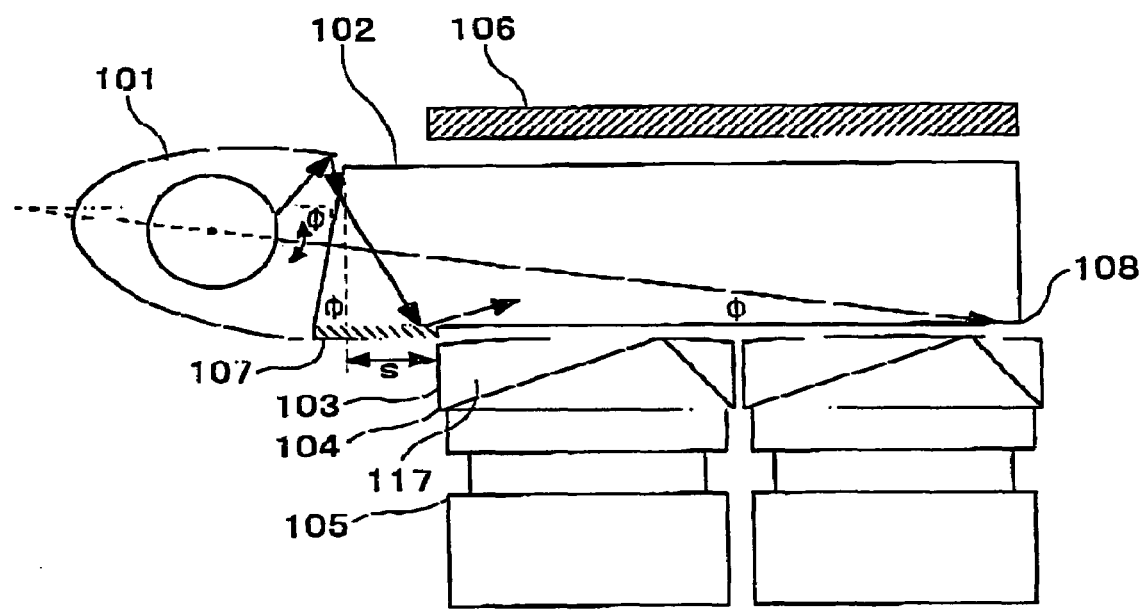
FIG. 11 is a section drawing of main portion of an illumination device schematically illustrating an eighth embodiment of the invention.

FIG. 11 is a section drawing of main portion of an illumination device schematically illustrating an eighth embodiment of the invention. The embodiment is same as the first embodiment except below requirements. Repetitive description of the same portions a in the first embodiment is omitted. In the embodiment, angle $\Phi$ of a light a after having entered the light pipe 102 in the first embodiment is not fixed to a value of equation 2 (eq: 2). A slant $\Phi'$ of the light source unit 101 deciding the angle $\Phi$ changes being synchronized with a cycle of contact and separation of the unit reflection bodies 103, and the angle $\Phi$ is controlled so as to get values in range described below:

$$\text{Arc tan}(dkm/L) \geq \Phi \geq \text{Arc tan}(dkm/L(2km-1)), \quad \text{(eq: 7)}$$

where d is a thickness in a vertical direction for the outgoing light surface of the light pipe; m is a divide number of the reflection body; and k is a ratio (duty number) at which the reflection body contacts the light pipe.

In the embodiment same as in the fire embodiment, m=16 and k=¼ are assumed, so:

$$\text{Arc tan}(4dL) \geq \Phi \geq \text{Arc tan}(4dL(8-1)), \quad \text{(eq: 8)}$$

thereby about $8 \geq \Phi \geq 1$ in angle being obtained because of d=8 mm and L=230 mm.

A maximum value of the $\Phi$ is an angle at which lights having entered the thickness middle of the light pipe 102 reaches a middle of a distance for four pieces of unit reflection bodies 103 from the light source unit 101, that is, a position for two pieces unit reflection bodies 103: A minimum value is an angle at which lights roaches the middle of the distance for four pieces of unit reflection bodies 103 from a far end side of a sidelight, that is, a position for two pieces or unit reflection bodies 103 from the far end side. When the selected four it reflection bodies 103 exist at a near side, the slant $\Phi'$ of the light source unit 101 is controlled so that the $\Phi$ gets the maximum value, thereby a light so being set so that lights directly hit the selected unit reflection bodies: When the selected four unit reflection bodies 103 exist at the farthest side, the slant $\Phi'$ of the light source unit 101 is controlled so that the $\Phi$ gets the minimum value, thereby the light axis being set so that lights directly hit the selected unit reflection bodies.

Even when the selected four unit reflection bodies 103 exist at an intermediate place, the slant $\Phi'$ of the light source unit 101 is controlled so as to match the light axis with their middle. When the four unit reflection bodies are separated into two, the far side and near side of the sidelight, the slant $\Phi'$ is spent to match a more side in number or as time to return the slant $\Phi'$ of the light source unit 101. Meanwhile, although the embodiment composes so that another light source unit is placed so as to pinch the light pipe 102, thereby lights respectively entering from both side edges of the light pipe 102, it is not shown in the drawing. These two light source units have different slants $\Phi'$, respectively, and in accordance with a selection of unit reflection bodies 103, control the slants $\Phi'$.

By thus changing the slant $\Phi'$ of the light source unit 101, a ratio at which lights emitted from the light source unit 101 enter the selected unit reflection bodies 103 is improved thereby the light utilizing efficiency being able to be more improved then that of the first embodiment. In the embodiment, the reflection surfaces 104 of the unit reflection bodies 103 are one mountain shape as in the seventh embodiment. Moreover, slants of the mountain shape are different in individual unit reflection bodies. An angle $\theta$ which the reflection surface 104 of each unit reflection body makes with an outgoing light surface of the light pipe 102 is, on a surface of light source unit side of the unit reflection bodies 103 at a near end portion of a light source unit in question:

$$\theta=(90-\Phi)/2 \text{ and } \Phi=\text{Arc tan}(dm/L), \quad \text{(eq:9)}$$

on a surface of light source unit side of the unit reflection bodice 103 at a far end portion from the light source unit in question:

$$\theta=(90-\Phi)/2 \text{ and } \Phi=\text{Arc tan}(dm/L(2m-1)), \quad \text{(eq:10)}$$

and between the portions, the $\theta$ is designed to gradually change.

Is The angles $\theta$ are designed to be angles at which lights proceeding in the unit reflection bodies 13 at each position reflect and vertically be emitted from an outgoing light surface of the light pipe 102. Meanwhile, in the embodiment as described before, the light source units 101 are placed at both sides of the light pipe 102 like pinching it, whereby the reflection surfaces 104 within the unit reflection bodies 103 are one mountain shape and surfaces facing respective light source units 101 have different angles.

As thus described, being compared with the first embodiment, although the embodiment controls slants, without fixing them, for the ends of side edges of light pipe 102 of the light source units 101 matching a selection of the unit reflection bodies 103, has one mountain shape as also a shape of the reflection surfaces 104, and also adjusts angles of the mountain shape for each unit reflection body, the embodiment is not different in a point that it can selectively/concentratingly emit lights which have entered the light pipe 102, same as the first embodiment, from the outgoing light surface of the light pipe 102, only from a selected region which the unit reflection bodies 108 contact. In addition, controlling the light source units 101, the embodiment makes lights entering the light pipe 102 directly reach the selected unit reflection bodies 103 and also adjusts the reflection surfaces 104 for each unit reflection body, the light utilizing efficiency is more heightened than that of the first embodiment.

Meanwhile, although the embodiment make slants of the light source units 101 for the ends of the light pipe 102 same as the first embodiment, it goes without saying that it is also available to make end shapes of side edges of the light pipe 102 vertical for an outgoing light surface, thereby controlling the slants of the light source unite 101, and to make a refractive optical is element intervene between the light source units 101 and light pipe 102 and control the slants, thereby changing a light axis. In addition, an LED array may be used as a light source unit same as in the embodiment.

i. Ninth Embodiment

Figure 12:
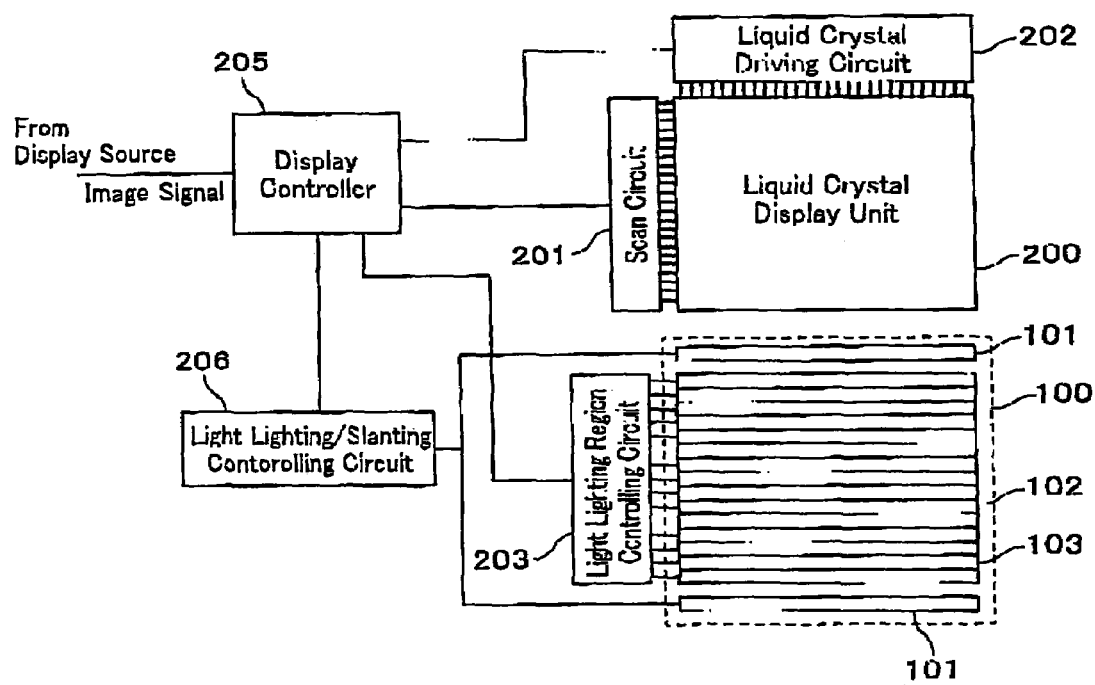
FIG. 12 is a block diagram of drive system example of a liquid crystal display illustrating a ninth embodiment of the invention.

FIG. 12 is a block diagram of drive system example of a liquid crystal display illustrating a ninth embodiment of the invention and is a liquid crystal display the illumination device illustrated in FIG. 8. Meanwhile, the embodiment is the same as the second embodiment except following requirements. That is, a display device of the embodiment uses an illumination device equipped with the cold cathode luminescence light of the eighth embodiment. The illumination device is, as described in the eight embodiment, designed to control the slants of the light source units 101 matching the selection of the unit reflection bodies 103. Therefore, the embodiment is equipped with a light lighting/slanting circuit instead of the light lighting circuit 204 of the second embodiment, and controls the lighting of the light source units 101 with the light lighting/slanting circuit 206 and the slants for the ends of side edges of the light pipe 102.

Meanwhile, also in the embodiment, because the selection of unit reflection bodies 103 is synchronized with an image rewrite scan of the liquid crystal display unit 200 same as in the second embodiment, it is necessary to control also the slants of the light source units 101 synchronized with the image rewrite scan of the display unit 200. As for this, the display controller 205 is designed to control this by sending control signals to the light lighting/slanting circuit 206 with synchronizing the signals with an image scan. As thus described, the embodiment uses the display device described in the eighth embodiment as a backlight and controls the unit reflection bodies 103 and light source units 101 with which a rewrite cycle of a liquid crystal display unit is synchronized, whereby the embodiment is higher in the light utilizing efficiency than the second embodiment and can provide a display device of which motion picture display is clearer.

j. Tenth Embodiment

Figure 13:
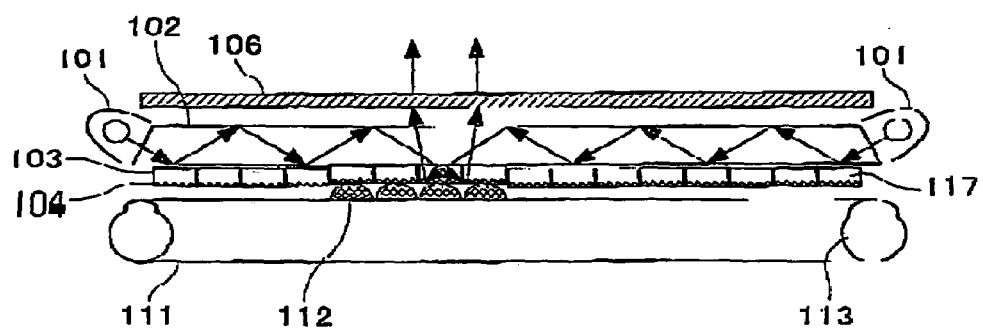
FIG. 13 is a general section drawing of main portion of an illumination device schematically illustrating a tenth embodiment of the invention.

FIG. 13 is a general section drawing of main portion of an illumination device schematically illustrating a tenth embodiment of the invention. The embodiment is same as the first embodiment except following requirements That is, the embodiment adopts a system rotating an endless belt 111 with protrusions 112 under a rear surface of the unit reflection bodies 103 using rotors 113 as a mechanism of making the unit reflection bodies 103 contact and separate from the light pipe 102. In the embodiment same as in the first embodiment, because the divide number of th reflection body unit is 16 and lighting duty is one fourth a number of protrusion 112 ranked at a same cycle with the unit reflection bodies 103 is made four. Meanwhile, a rotation of the endless belt 111 with the protrusions be controlled from outside, and when practically built in a display device, the belt rotates at 60 Hz being synchronized with a screen rewrite scan of a liquid crystal display unit.

As thus described, being compared with the first embodiment, although the embodiment is composed so that the contact and separation of the unit reflection bodies 103 are performed by the rotation of the endless belt 111 with the protrusions, there exists no difference in a point that lights having entered the light pipe 102 from the light source units 101 same as in the first embodiment can selectively/concentratingly be emitted only from the selected region which the unit reflection bodies 103 contact. In addition, because the embodiment is designed to make the light source units 101 have angles, thereby lights surely reaching the selected region, and to make the reflection surfaces 104 within the unit reflection bodies 108 have angles, thereby lights within the light pipe 102 being vertically emitted mainly for the outgoing light surface, a ratio of outgoing lights for incident lights, so called the light utilizing efficiency, becomes very high same as that of the first embodiment.

Meanwhile, although the embodiment makes slants of the light source units 101 for the light pipe 102 and the end shapes of side edges of the light pipe 102 same as the first embodiment and makes a light axis within the light pipe 102 then Φ, as in the third embodiment, only the light source units 101 may be slanted and to make the ends of side edges of the light pipe 102 have angles is available: it goes without saying that a light axis may also be changed by refractive optical element being placed between the light source units 101 and light pipe 102. In addition, an LED array may be used as a light source unit same as in the sixth embodiment and the reflection surfaces 104 may be made one mountain shape same in the seventh embodiment. Moreover, as in the eight embodiment, the slants of the light source units 101 being made controllable, the light utilization efficiency can still be improved. Then, the illumination device of the embodiments being used the display devices such as the second and eighth embodiments which can clearly display motion pictures and still pictures clearly can be composed.

k. Eleventh Embodiment

Figure 14:
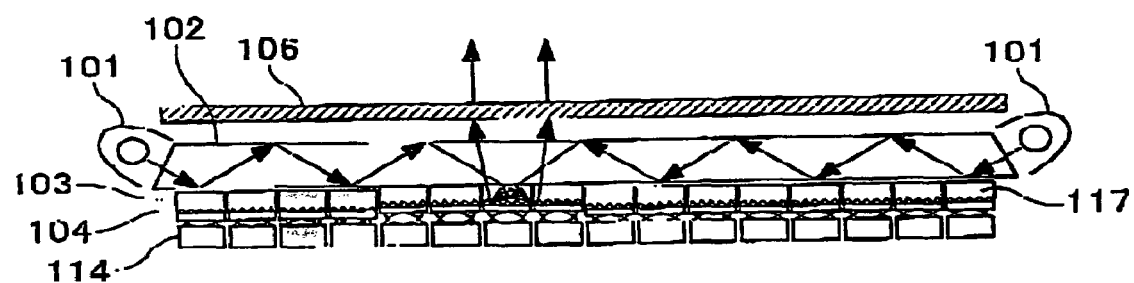
FIG. 14 is a general section drawing of main portion of an illumination device schematically illustrating an eleventh embodiment of the invention.

FIG. 14 is a general section drawing of main portion of an illumination device schematically illustrating an eleventh embodiment of the invention. The embodiment is same as the first embodiment except following requirements. That is, the embodiment uses shape-memory alloy actuators 114 composed of one pair of shape memory alloys as a mechanism of making the unit reflection bodies 103 contact and separate from the light pipe 102. The shape-memory alloy actuator 114 uses one pair of spring-form alloys returning to a shape memorized in advance by heat being applied. That is, if heat is applied, on alloy moves the reflection body 103 to a contact direction and the other alloy moves the reflection body 103 to a separation direction. Heat application to alloys assumes them as electric resistance bodies and controls them by currents being flowed to them. One pair of the shape-memory alloy actuators 114 are disposed at the rear surfaces of individual unit reflection bodies 103, respectively, and the contact and separation of the unit reflection bodies 103 with/from the light pipe 102 are controlled by currents being flowed to the respective alloys.

As thus described, being compared with the embodiment, although the embodiment uses the shape-memory alloy actuators 104 for the contact and separation of the unit reflection bodies 103 with/from the light pipe 102, there exists no difference in a point that lights having entered the light pipe 102 same as in the first embodiment can selectively/concentratingly be emitted only from a selected region which the unit reflection bodies 103 contact. In addition, because the embodiment is designed to make the light source units 101 have angles, thereby lights surely reaching the selected region, and to make the reflection surfaces 104 within the unit reflection bodies 103 have angles, thereby lights within the light pipe 102 bends vertically emitted mainly for the outgoing light surface, a ratio of outgoing lights for incident lights, so called the light utilizing efficiency, becomes very high same as that of the first embodiment.

Meanwhile, although the embodiment makes slants for the light pipe 102 of the light source units 101 and the end shapes of side edges of the light pipe 102 same as the first embodiment and makes a light axis within the light pipe 102 the Φ, as in the third embodiment, only the light source units 101 may be slanted and to make only the ends of the light pipe 102 have angles is available. In addition, it goes without saying that the light am may be changed by placing refractive optical elements between the light source units 101 and light pipe 102 as shown in FIG. 8.

In addition, an LED array may be used as a light source unit same as in the sixth embodiment and the reflection surfaces 104 may be made one mountain shape same as in the seventh embodiment. Moreover, as in the eight embodiment, controlling slants of the light source units 101 for the ends of the light pipe 102, th light utilization efficiency can still be improved. Meanwhile, using the illumination device of the embodiment being used, the display devices such as the second and eighth embodiments which can clearly display motion pictures and still pictures clearly can be composed.

l. Twelfth Embodiment

Figure 15:
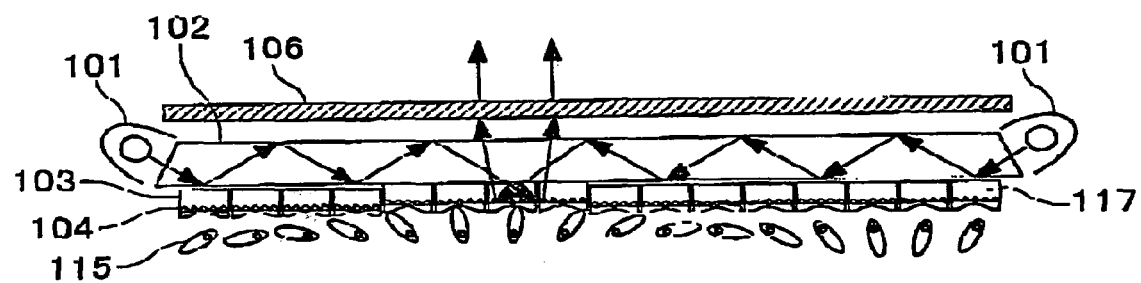
FIG. 15 is a general section drawing of main portion of an illumination device schematically illustrating a twelfth embodiment of the invention.

FIG. 15 is a general section drawing of main portion of an illumination device schematically illustrating a twelfth embodiment of the invention. The embodiment is same as the first embodiment except following requirements. That is, the embodiment disposes rotors 115 which are fixed at different angles at the rear surfaces of every unit reflection bodies 103 and of which shafts are eccentric as a mechanism of contact and separation of the unit reflection bodies 103 with/from the light pipe 2. The shafts of the rotors 115 are also parallel to the light source units 101 in a longitudinal direction and all shafts of the rotors 115 are connected with an end portion of the light pipe 102 perform same rotation. The rotors 115 rotate according to the rotation of the shafts and when lengthy portions in length position at the side of the unit reflection bodies 103, the rotors 116 push up the unit reflection bodies 103, thereby contacting them with the light pipe 102. When the lengthy portions leave the unit reflection bodies 103, they are separated from the light pipe 102 by their springs at the light pipe end portion side. At the same time, a number of unit reflection bodies 103 contacting the light pipe 102 can be set by which degrees of angles are made with the lengthy portions of length of the rotors 115.

As thus described, the mechanism of contact/separation of the unit reflection bodies 103 with/from the light pipe 102 being compared with that of the first embodiment, although the embodiment converts rotation movement by the rotors 115 with eccentric shafts to reciprocation movement of contact/separation, there exists no difference in a point that lights having entered the light pipe 102 same as in the first embodiment can selectively/concentratingly be emitted only from a selected region which the unit reflection bodies 103 contact. In addition, because the embodiment is designed to make the light source units 101 have angles, thereby lights surely reaching the selected region, and to make the reaction surfaces 104 within the unit reflection bodies 103 have angles, thereby lights within the light pipe 102 being vertically emitted mainly for the outgoing light surface, a ratio of outgoing lights for incident lights, so called the light utilizing efficiency, becomes very high same as that of the first embodiment.

Meanwhile, although the embodiment makes slants for the light pipe 102 of the light source units 101 and end shapes of side edges of the light pipe 102 same as the first embodiment and makes light axis within the light pipe 102 the Φ, as in the third embodiment only the light source units 101 may be slanted and to make only the ends of the light pipe 102 have angles is available. In addition, it goes without saying that the light axis may be changed by placing refractive optical elements between the light source units 101 and light pipe 102.

In addition, an LED array may be used as a light source unit same as in the sixth embodiment and the reflection surfaces 104 may be made one mountain shape same as in the seventh embodiment. Moreover, as in the eight embodiment, controlling slants of the light source units 101 for the ends of the light pipe 102, the light utilization efficiency can still be improved. Meanwhile, using the illumination device of the embodiment, the display devices such as the second and eighth embodiments which can clearly display motion pictures and still pictures clearly can be composed.

Figure 16:
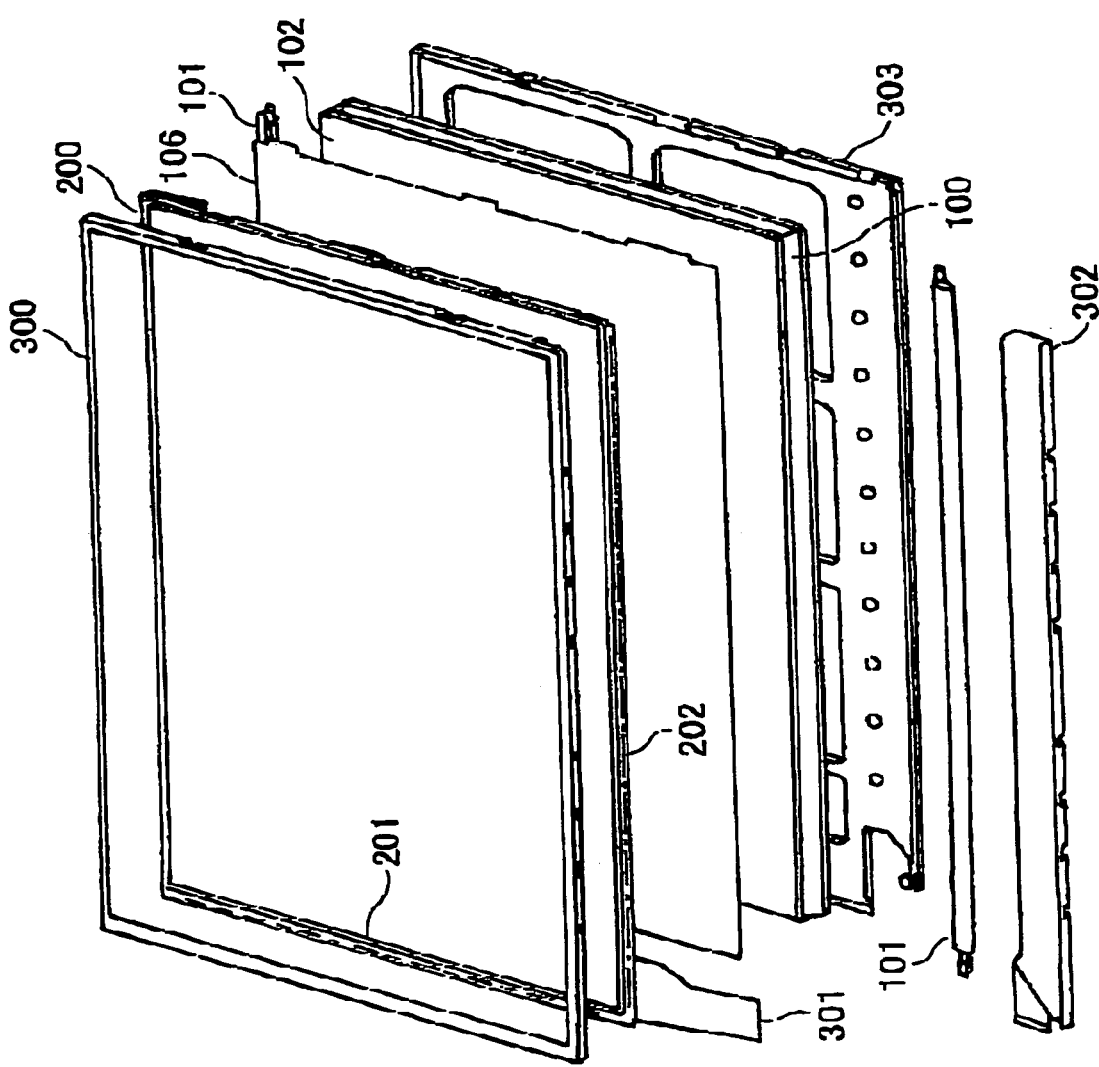
FIG. 16 is an unfolded perspective view illustrating a general configuration example of display unit of the invention.

FIG. 16 is an unfolded perspective view illustrating a general configuration example of a display unit of the invention. In the display device, the light source units 101, light pipe 102, and backlight 100 composed of a mechanism of contact with and separation from the reflection body unit and light pipe 102 are stacked under the display unit 200 through the scattering sheet 106. Meanwhile, although between the scattering sheet 106 and display unit 200 exist optical components such a prism sheet and other scattering sheet in some cases, they arm omitted in the drawing. In a periphery composing the display unit 200, a semi-conductor chip 201 of a scan circuit and a semi-conductor chip 202 of a crystal liquid driving circuit are mounted. In addition, flexible print boards 301 and 302 are connected with the semi-conductor chip 201 of the scan circuit and the semi-conductor chip 202 of the crystal liquid driving circuit. These components are pinched and fixed with an upper frame 300 and lower frame 303 as a package.

Figure 17:
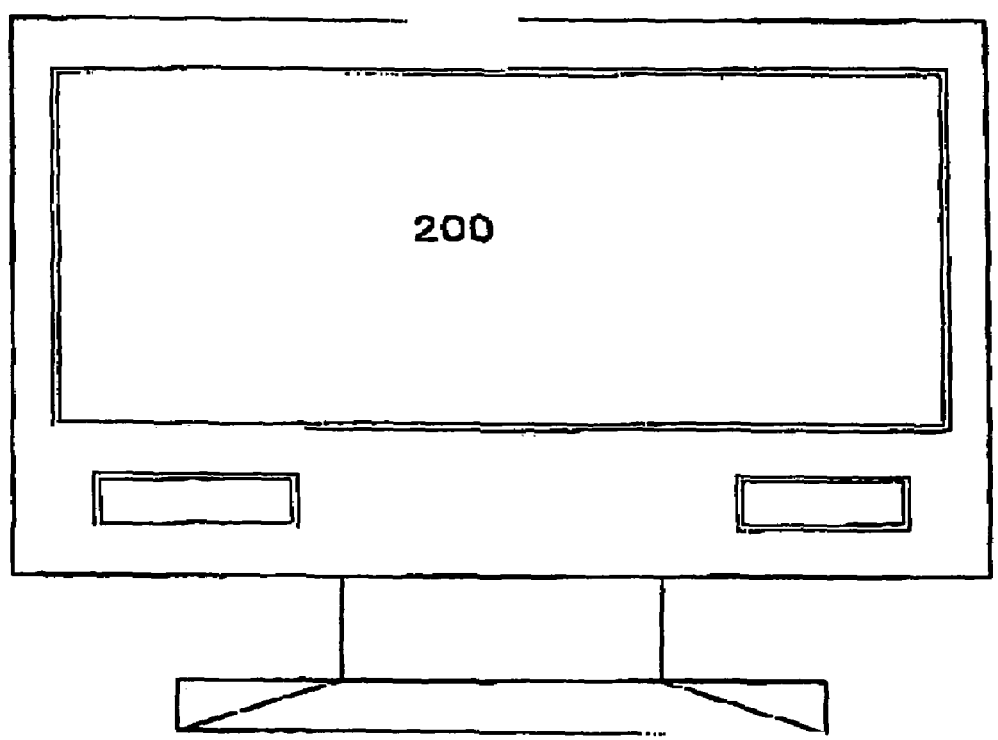
FIG. 17 is an appearance drawing of a liquid crystal color television which is an example of electronic appliances mounting a display unit of the invention.

FIG. 17 is an appearance drawing of a liquid crystal color television which is an example of electronic appliances mounting a display unit of the invention. In the display unit 200, the liquid crystal display illustrated in FIG. 16 is mounted. In addition, the display device of the invention is adaptable to a wide range of applications Such as a note PC and various kinds of monitors.

What is claimed is:

1. An illumination device having a light pipe of a substantially parallel flat-form sheet, of which one surface is an outgoing light surface, and a light source unit is placed along one side edge and opposite both side edges, the device comprising:
   a light axis of lights unparallel to said outgoing light surface of said light pipe after the lights having entered said light pipe from said light source;
   a reflection body unit consisting of plural unit reflection bodies divided into m in a vertical direction of said light source unit at an opposite side surface of said outgoing light surface of said light pipe; and
   a reflection surface existing inside said unit reflection bodies, and reflecting lights which have entered within the reflection body from inside of the light pipe in contacting said light pipe in the outgoing light surface direction of the light pipe,
   wherein said reflection body unit can contact and separate from the opposite side surface of said outgoing light surface of said light pipe for every said unit reflection bodies, and
   wherein each unit reflection body composing said unit reflection body is composed of material substantially equal in a refractive index to said light pipe.

2. An illumination device according to claim 1, wherein a light axis of lights entering said light pipe from said light source unit is unparallel to said outgoing light surface of said light pipe.

3. An illumination device according to claim 2, wherein said light source unit is composed of a linear light source and on optical component which makes a light axis enter said light pipe from said light source unit provided between the linear light source unit and said light pipe.

4. An illumination device according to clam 3, wherein said optical element disposed between said light unit and said light pipe makes axis direction to said light pipe changeable for said light source unit in a vertical plane.

5. An illumination device according to any of claims 2 or 3, wherein an angle $\Phi'$ which a light axis entering said light pipe makes with said outgoing light surface of said light pipe in a vertical plane for said light source unit is:

$$\mathrm{Sin}\ \Phi' = n\ \mathrm{Sin}\ \Phi,$$

where $\Phi \geq \mathrm{Arc\ tan}(dkm/L)$; n is a refractive index of the light pipe; d is a thickness in a vertical direction for the outgoing light surface of the light pipe; m is a divide number of said reflection body; L is a length of an outgoing light surface; and k is a ratio (duty number) at which said reflection body contacts the light pipe.

6. An illumination device according to any of claims 2 or 3, wherein an angle $\Phi'$ which a light axis entering said light pipe makes with said outgoing light surface of said light pipe in a vertical plane for said light source unit is:

$$\mathrm{Sin}\ \Phi' = n\ \mathrm{Sin}\ \Phi,$$

where;

$$\Phi \geq \mathrm{Arc\ tan}\ (dkm/2L),$$

and n is a refractive index of the light pipe; d is a thickness in a vertical direction for the outgoing light surface of the light pipe; m is a divide number of said reflection body; L is a length of an outgoing light surface; and k is a ratio (duty number) at which said reflection body contacts the light pipe.

7. An illumination device according to any of claims 2, or 10, wherein said light a urea unit makes an a direction of outgoing lights changeable for said light source unit in a vertical plan.

8. An illumination device according claim 4, wherein a change of a light is of lights entering said light pipe by each one of said light source unit and said optical element is synchronized with a cycle of contact and separation.

9. An illumination device according to claim 4: wherein a change of a light axis of lights, which enters said light pipe by said light source unit and said optical element, makes an angle $\Phi$, which the light axis after having entered makes with an outgoing light surface of said light pipe for said light source unit in a vertical plane; and wherein the angle $\Phi$ is in a range of:

$$\mathrm{Arc\ tan}(dkm/L) > \Phi > \mathrm{Arc\ tan}(dkm/(2km-1)),$$

where d is a thickness in a vertical direction for an outgoing light surface of the light pipe; m is a divide number of the reflection body; L is a length of an outgoing light surface; and k is a ratio (duty number) at which the reflection body contacts the light pipe.

10. An illumination device according to claim 1, wherein an end opposite to said light source unit of the light pipe slants for said outgoing light surface.

11. An illumination device according to claim 10, wherein an angle $\theta$ which an end of said light source unit side makes with a vertical plane of said outgoing light surface of said light pipe has a relationship as:

$$\mathrm{Sin}\ \theta = n\ \mathrm{Sin}\ \theta',$$

where;

$$\theta \cdot \theta' = \Phi,$$

$$\Phi \geq \mathrm{Arc\ tan}\ (dkm/L),$$

and n is a refractive index of the light pipe; d is a thickness in a vertical direction for the outgoing light surface of the light pipe; m is a divide number of said reflection body; L is at length of an outgoing light surface; and k is a ratio (duty number) at which said reflection body contacts the light pipe.

12. An illumination device according to claim 10, wherein an end of said light source unit aide of said light pipe slants for said outgoing light surface; wherein, at said light source unit side of a side surface for which said end of said light pipe makes an acute angle, an optical element absorbing or reflecting lights is disposed; and wherein a length I from an obtuse side end of said end is:

$$I = d\ \mathrm{tan}(\mathrm{Arc\ Sin}\ 1/n),$$

where d is a thickness in a vertical direction for an outgoing light surface of a light pipe and n is a refractive index of the light pipe.

13. An illumination device according to claim 10, wherein an angle $\theta$ which an end of ad light source unit side makes with a vertical plane of said outgoing light surface of said light pipe is:

$$\mathrm{Sin}\ \theta = n\ \mathrm{Sin}\ \theta',$$

where;

$$\theta - \theta' = \Phi,$$

$$\Phi \geq \mathrm{Arc\ tan}(dkm/2L),$$

and n is a refractive index of the light pipe; d is a thickness in a vertical direction for the outgoing light surface of the light pipe; m is a divide number of said reflection body; L is a length of an outgoing light surface; and k is a ratio (duty number) at which said reflection body contacts the light pipe.

14. A illumination device according to any of claims 1, 2, or 10, wherein a light axis of lights entering said light pipe from said light source unit is unparallel to said outgoing light surface of said light pipe and an end of said light source unit side slants for said outgoing light surface.

15. An illumination device as in one of claims 1-10, wherein an angle Φ which a light a of lights after having entered said light pipe makes with said outgoing light surface of sad light pipe in a vertical plane for said light source unit is:

$$\Phi \geq \text{Arc tan}(dkm/L),$$

where d is a thickness in a vertical direction for the outgoing light surface of the light pipe; m is a divide number of said reflection body; L is a length of an outgoing light surface; and k is a ratio (duty number) at which said reflection body contacts the light pipe.

16. An illumination device as in one of claims 1-10, wherein an angle Φ which a light axis of lights after having entered said light pipe makes with said outgoing light surface of said light pipe in a vertical plane for said light sources unit:

$$\Phi \geq \text{Arc tan}(dkm/2L),$$

where d is a thickness in a vertical direction for the outgoing light surface of the light pipe; m is a divide number of said reflection body; L is a length of an outgoing light surface; and k is a ration (duty number) at which said reflection body contacts the light pipe.

17. An illumination device as in any one of claims 1-10, 11, 12, or 13, wherein reflection surfaces inside a unit reflection body composing said reflection body unit are parallel to said light source unit and a mountain-shape, and wherein a scattering profile of the mountain-shape is uniform in all unit reflection bodies.

18. An illumination device according to claim 17, wherein an angle θ which is made with reflection surfaces inside a unit reflection body composing said reflection body unit and an outgoing light surface of said light pipe is:

$$\theta=(90-\Phi)/2,$$

where:

$$\Phi \geq \text{Arc tan}(dkm/L),$$

and d is a thickness in a vertical direction for the outgoing light surface of the light pipe; m is a divide number of said reflection body; L is a length of an outgoing light surface; and k is a ratio (duty number) at which said reflection body contacts the light pipe.

19. An illumination device as in any one of claims 1-10, 4, or 9, wherein reflection surfaces inside a unit reflection body composing said reflection body unit are parallel to said light source unit and a mountain-shape, and wherein a scattering profile of the mountain-shape is different between near and far ends of said light source unit and a middle of the light pipe.

20. An illumination device according to claim 19, wherein an angle θ which is made with reflection surfaces inside a unit reflection body composing said reflection body unit and an outgoing light surface of said light pipe is at a near end portion of said light source unit:

$$\theta=(90-\Phi)/2 \text{ and } \Phi=\text{Arc tan}(dm/L),$$

at a far end portion from the light source unit:

$$\theta=(90-\Phi)/2 \text{ and } =\text{Arc tan}(dm/L(2m-1)), \text{ and}$$

wherein the angle θ has a gradual change between said near and portion and said far end portion; and wherein when said light source units exist at both side edged, the angle θ of respective opposite surfaces of said mountain-shape within a reflection body inside unit reflection body composing said reflection body unit is composed as above.

21. An illumination device having a light pipe of substantially parallel flat sheet-form, of which no surface is an outgoing light surface, and a light source unit(s) placed along one side edge and opposite two side edges of said light pipe, the device comprising:
a reflection body unit consisting of plural unit reflection bodies divided into m in a vertical direction for said light source unit at an opposite side surface of said outgoing light surface of said light pipe;
wherein said unit reflection body unit can contact and separate from the opposite side surface for said every unit reflection bodies;
wherein a refractive index of each unit reflection body is equal to the refractive index of said pipe and each unit reflection body is composed of substantially equal material in the refractive index to said pipe;
wherein said unit reflection bodies divided into m, of which j pieces (j≦m) concurrently contact said light pipe, inside thereof have reflection surfaces composed so as to reflect lights, which have entered within each unit reflection body from inside of the light pipe in contacting said light pipe, in an outgoing light direction of the light pipe; and
wherein moat of lights having entered said light pipe from said light sources unit totally reflect once at an inner surface of said light pipe until a position equivalent to said j pieces of unit reflection bodies.

22. An illumination device as in any one of claims 1-10, 11, 12, 13, 4, 9, or 21, wherein mountain-shaped reflection surfaces within said unit reflection bodies are composed of plural mountain-shapes.

23. An illumination device as in any one of claims 1-10, 11, 12, 13, 4, 9, or 21, wherein mountain-shaped reflection surfaces within said unit reflection bodies are composed of one mountain-shape.

24. An illumination device as in any one of claims 1-10, 11, 12, 13, 4, 9, or 21, wherein said light pipe side surface of said unit reflection bodies consists of material which can be easily deformed.

25. An illumination device as in any one of claims 1-10, 11, 12, 13, 4, 9, or 21, wherein said light pipe side surface of said unit reflection bodies is a smooth mountain shape of which height of a middle portion is high.

26. An illumination device as in any one of claims 1-10, 11, 12, 13, 4, 9, or 21, wherein a means to make said unit reflection bodies contact and separate from said light pipe is actuators which are placed at an opposite side of raid light pipe of said each unit reflection body and change electric signals to variations of positions.

27. An illumination device as in any one of claims 1-10, 11, 12, 13, 4, 9, or 21, wherein a means to make void unit reflection bodies contact and separate from said light pipe is a rotating endless belt with protrusions which is placed at an opposite side of said light pipe of said each unit reflection body, and wherein said contact and separation are selected by a rotation of the endless belt.

28. An illumination device as in any one of claims 1-10, 11, 12, 13, 4, 9, or 21, wherein a means to make said unit reflection bodies contact and separate from said light pipe is two pairs of shape-memory alloys which are placed at an opposite side of said light pipe of said each unit reflection body and return to original shapes by heat application.

29. An illumination device as in any one of claims 1-10, 11, 12, 13, 4, 9, or 21, wherein a means to make said unit reflection bodies contact and separate from said light pipe is a rotor which is fixed at a different angle for every said each unit reflection body and of which rotation shaft is eccentric.

30. A display device of which illumination device is said illumination device as in any one of claims 1-10, 11, 12, 13, 4, 9, or 21, the device comprising:
- a plurality of scan lines formed at least one of a pair of boards pinching a liquid crystal layer and extending in a First direction and parallel provided in a second direction intersecting the first direction, a plurality of signal lines extending said second direction and parallel provided in said first direction, and a display panel equipped with pixels at said intersection portions of said scan lines and said signal lines;
- a scan line driving circuit selecting said scan lines in predetermined turn, and a signal line driving circuit applying image signals supplied from a display source to said signal lines selected by said scan circuit;
- an illumination device stacked at one side of said one pair of boards of said liquid crystal display panel, and giving illumination lights to the display panel; and
- a control circuit receiving image signals from said display source and controlling said scan line driving circuit, said signal line driving circuit, and said illumination device.

31. A display device according to claim 30, wherein a scan direction of said scan lines by said scan line driving circuit and an m-divide direction are same, and
- wherein being synchronized with a an cycle of said scan line driving circuit, said control circuit contacts ad separates from m-pieces of reflection bodies composing a reflection body unit of said illumination device.

32. A illumination device according to claim 30, wherein said control circuit operates by changing a mode, which synchronizes a cycle of contact with and separation from said light pipe of unit reflection bodies composing a reflection body unit of said illumination device by image signals from said display source with said scan cycle, to and from a high frequency mode.

* * * * *